INVENTORS:
THOMAS CLIFFORD WILLIAMS
SYDNEY ALFRED SHORTER
ATTORNEY

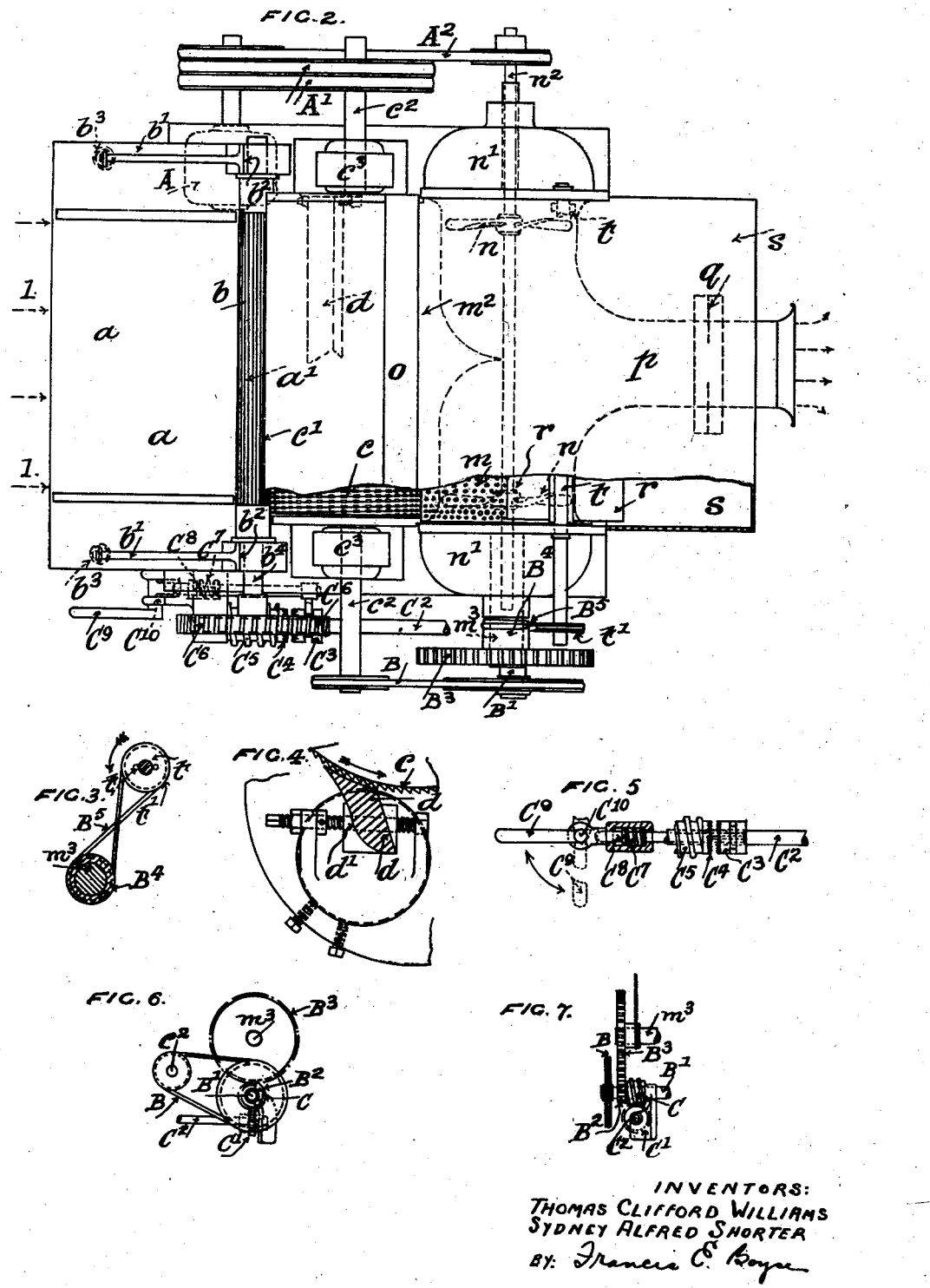

Patented Dec. 1, 1936

2,062,626

UNITED STATES PATENT OFFICE 2,062,626

METHOD AND APPARATUS FOR SEPARATING COMPONENT MATERIALS COMPRISED IN A MIXTURE

Thomas Clifford Williams and Sydney Alfred Shorter, Didsbury, Manchester, England, assignors to The British Cotton Industry Research Association, Manchester, England Application June 13, 1933, Serial No. 675,550
In Great Britain July 12, 1932

11 Claims. (Cl. 209—132)

This invention relates to a method and apparatus for separating component materials comprised in a mixture and has particular reference to the cleaning of fibrous materials, for example the removal from cotton of trash consisting of particles of leaves, stalk, seed and other unwanted matter, but the invention may also be used for other purposes.

It is well known to separate unwanted matter from wheat by causing the raw material to fall through a counter-current of air of a strength so regulated as to blow away the light impurities but to permit the heavier constituents to fall through it.

The tendency of any particle to remain suspended in any flowing current (hereinafter referred to as the "buoyancy" of the particle) varies according to the specific gravity of the particle, its size, shape, surface and weight distribution. The above known method is greatly inferior to the method hereinafter set out particularly for separating particles whose buoyancies do not differ very much from each other. In the known method above mentioned, particles of slightly less buoyancy tend to sink very slowly relatively to particles of slightly greater buoyancy and it is almost impossible to regulate the air current with sufficient nicety to effect their separation. Further in existing cleaning machinery for fibrous materials no effective use is made of the difference of buoyancy of the materials it is desired to separate, since by reason of the turbulence and eddying produced in such machines, the velocity and direction of the motion of the air, in regions where separation is desired, are subject to very irregular fluctuations so that though when averaged over a period of time the motion may have the correct characteristics, yet there are such large fluctuations around this average that adequate separation of the particles is not effected. It is thus quite useless in such cases to attempt to adjust the action of the operating fan of the machine to any supposed critical value, since any such nicety of adjustment is not reflected in the local characteristics of the air stream, and a particle of less buoyancy may be acted on by a stronger pneumatic force and be blown to a place where it is not wanted while a particle of greater buoyancy may be acted on by a weaker pneumatic force and remain where it also is not wanted.

It is also well known to blow or beat raw cotton in an opened condition over or against sieves or grids in the hope that wanted material will not pass through but be supported thereby and unwanted trash will pass through and remain separated therefrom, but if the openings of the sieves or grids are small enough so that practically all the wanted material is retained a large proportion of trash will also be retained and if the openings are large enough to permit a large proportion of trash to pass through they will also permit a wasteful proportion of wanted material to pass through. Further the sieves or grids as at present used themselves increase the turbulence and eddying of the air current and even if trash passes through it is frequently drawn or blown back and wanted material is frequently blown through the sieve or grid to waste.

It will be evident from the above considerations that eddies may act deleteriously because of their unstable or fluctuating character. Thus in the case of a stream passing through a settling chamber, it may happen that at one moment a particle may be carried downwards in an eddy, and on a change occurring in the nature of the motion, be left in a region of low velocity and so deposited in the chamber, in spite of the fact that in a steady stream its buoyancy would ensure its being carried forward.

We have found that if the materials to be separated from each other are conveyed for an appropriate distance by a current of fluid, e. g. a current of air, of such a character that there are no eddies except such as are of very small dimensions, materials having buoyancies not widely differing from each other can be successfully separated.

Such a flow may be called a "streamline flow", the term being used with reference to the effect produced on the motion of the suspended particles and irrespective of whether or not minute vortices may exist. In other words, we use the term "streamline flow" to mean a flow in which any vortices present are of too small linear dimensions to effect any appreciable displacement of the suspended particles.

The characteristics of such an air stream to a high degree determinate and capable of being regulated by adjustment of the air conveying means (e. g. by the adjustment of the speed of a fan or the aperture of a valve).

According to the present invention materials comprised in a mixture are separated by finely dividing the said mixture, producing a streamline flow, delivering the said mixture into the streamline flow in such manner as not to disturb the streamline character of the flow, conveying the mixture in such finely divided condition by the streamline flow, it being otherwise unsupported, regulating the flow so that components having greater buoyancy are conveyed thereby to one place while components having less buoyancy fall or are flung out therefrom before reaching the said place and maintaining the streamline character of the flow throughout the region where separation takes place.

Thus if it be desired to separate trash from raw cotton the latter may be fed in known manner to an opener of known construction which finely divides the raw material and projects it into an air current of streamline character. The raw material must be sufficiently finely divided so that substantially all the particles of wanted material are freed from the particles of unwanted material. In the case of cotton it is impracticable to divide it so finely that particles of trash have no lint adhering to them, but it must be sufficiently finely divided to ensure that the quantity of lint adhering is not sufficient to be unduly wasteful or to give particles of trash substantially the same buoyancy as particles of pure lint. In the case of mixtures containing materials of a powdery nature, they may be in sufficiently finely divided condition in their natural state, or may require to be ground up. The streamline current is obtained by suitably shaping and locating the passages through which the current is to pass and preventing the ingress of air at places where uncontrolled leaks would tend to destroy the streamline character of the flow and in some cases providing additional, preferably controlled, openings for the ingress of subsidiary streams, which will tend to improve the streamline character of the flow.

Where a revolving beater is used means are adopted to prevent the fan action of the beater destroying the streamline character of the main air stream and we have found the following means satisfactory. Preferably a beater is chosen whose fan action is as small as possible, e. g. one having teeth on a drum as opposed to one with large blades or having an open central space. There is provided for the main air stream a smooth preliminary path free from interference or disturbance such as operatives standing in the path or projections of any kind and of sufficient length before the inlet into the region where separation is to commence to ensure that the air flow settles down to one of streamline character. The inlet itself is smooth and is located near where the material is acted upon by the beater and is so directed that the direction of flow of the main air stream issuing therefrom conforms as nearly as possible to the direction in which the beater tends to propel the material and such air as it disturbs. This can be accomplished by locating the beater at one end of a plate the upper surface of which forms a path for the conveyance of the material to be separated to the beater and the lower surface of which forms the upper boundary of the path of the main air stream. The lower surface of the plate is smoothly curved at the inlet so as to give the main air stream the required direction of flow.

The magnitude of the air velocity in the region where settling occurs is conditioned by considerations of buoyancy. If this velocity is so low that there is danger that the air flow may become unstable, i. e. lose its streamline character, we may adopt means to increase the stability of the stream. These means include the constriction of the path by a smooth bounding wall thus increasing the air velocity and the provision of additional draughts. Such a draught may be admitted through an aperture in the constricting wall and directed by shaping the inlet so as to join smoothly the main stream.

The streamline flow may further be influenced by placing aerofoils or the like in the path thereof. In our experience such devices assist to maintain the streamline character of the flow, and they cause the flow to take a curved course, thus facilitating the removal from the stream of particles of less buoyancy, for there is then a tendency for these to be thrown out by centrifugal action in addition to their natural tendency to separate under the action of gravity.

It must be understood that the flow need be of streamline character only where eddying would interfere with the desired separation of materials, and that in regions where such separation is not intended, the flow need not be of a streamline character, and that we may even adopt means for producing turbulent motion where such motion may be useful for preventing the undesirable adhesion of cotton to the teeth or blades of the beater or other portions of the mechanism or in assisting the opening of the material. Where eddying motion is desired, we may make use of subsidiary streams directed so as to create eddying.

The invention will now be described by way of example in its application to the removal of trash from cotton with reference to the accompanying drawings wherein:—

Fig. 2 shows a broken plan view.

Figure 1:
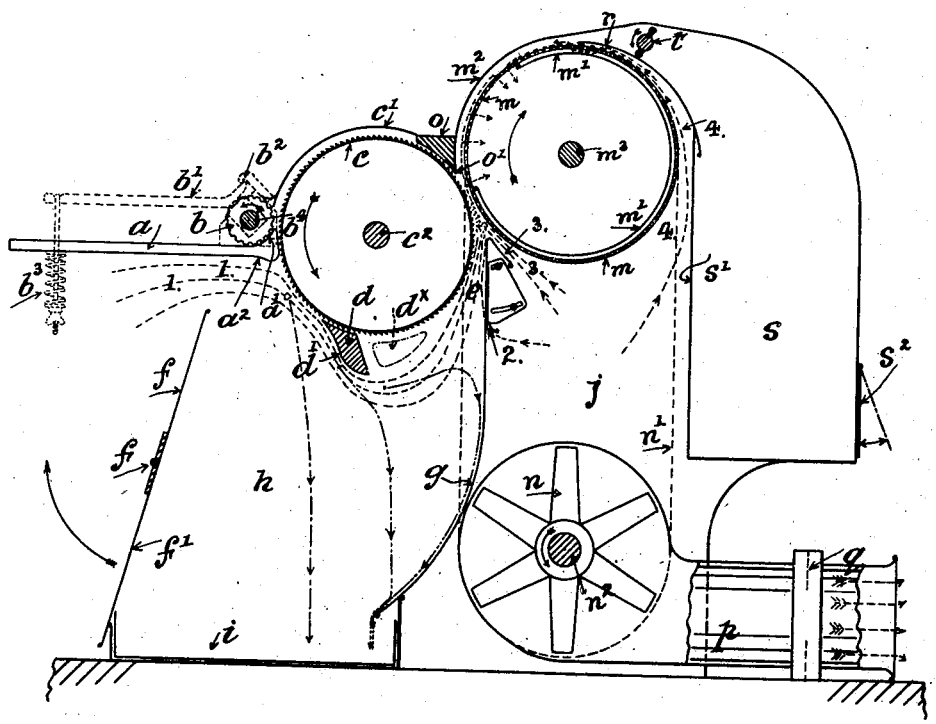
Fig. 1 is a sectional elevation of an apparatus made in accordance with this invention.

Fig. 3 indicates the drive for the clearer device.

Fig. 4 shows one way of mounting and adjusting a streamer plate.

Fig. 5 is a separate side view of the drive for the feed roller.

Figs. 6 and 7 are separate detail views of the driving arrangement for the shaft of the cage, etc.

Referring to Fig. 1, $a$ is a feed plate having a dished end $a^1$ adapted to co-operate with a feed roller $b$ mounted on the shaft $b^4$. The latter is rotated by means hereinafter described. The feed roller $b$ is loaded by a lever $b^1$ fulcrumed at $b^2$ and drawn down by a spring $b^3$. Upon a shaft $c^2$ is mounted an opening roller $c$ which may be of any suitable construction, for example it may have a spiral slot in its periphery which holds a projecting saw toothed wire. An air stream $l$ is caused to flow by means of fans or propellers hereinafter described and after flowing through an unobstructed preliminary passage of sufficient length to ensure that the character of the flow becomes streamline flows through the top of a setting chamber $h$. The said chamber has a front wall $f$ with a door $f^1$ hinged at $f^2$, a back wall $g$ and side walls. At the bottom of the settling chamber is provided a receptacle $i$, removable through the door $f^1$.

The settling chamber is constructed so that air is not permitted to enter except at the openings designed for such entry. Air is drawn in through the opening $l^x$ and flows through the top of the chamber $h$ and escapes through the opening $e$. A cover $c^1$ is provided over the opening roller $c$ which cover constitutes the top of the settling chamber. There may be provided secondary air entry openings, one such being shown at $2$, and these may be made adjustable. There may be provided in the path of the air stream a streamer plate $d$ in the nature of an aerofoil, having a face $d^1$ suitably curved so as to deflect the air stream and cause it to follow a more curved course than it would otherwise take. The streamer plate is positioned as close as possible to the opening roller $c$ and may be made adjustable both as to its angular position and as to its distance from the opening roller $c$ by the supporting means shown in Fig. 4 which are located at each end of the streamer plate.

In operation, raw cotton is fed at a controlled rate by the feed roller $b$ to the rapidly revolving opening roller $c$ which opens the raw cotton into a finely divided condition and projects it into the air stream $l$. It has been found that 900 revolutions per minute of an opening roller of 9 inches diameter gives satisfactory results. The shape of the opening $l$ and of the underside $a^2$ of the feed plate, and of the settling chamber generally, is such that the air stream $l$ maintains the streamline character, having no eddies in the main course of the flow, and care is taken to obviate the presence of any constructional members which would form obstructions to the flow of such a character as to cause eddying. The finely divided raw cotton, consisting of particles of lint, trash, dust and dirt is conveyed by the air stream over the top of the settling chamber. Particles of less buoyancy, i. e. the less buoyant dust and trash tend to settle out under the action of gravity.

The presence of the streamer plate $d$ causes the air stream to take a curved path with the result that the path is longer thereby giving more opportunity for unwanted particles to be deposited and a centrifugal effect is produced upon all particles being conveyed by the air stream and those with less buoyancy tend to be flung out. In practice the curvature of the path has been found to assist in maintaining the streamline character of the flow but the curvature is limited because excessive curvature will destroy the streamline character of the flow, and if this happens successful separation will no longer be achieved. It is not possible to work with the conditions such that the air stream is on the point of losing its streamline character, for the loading of the air stream with the raw material and the removal therefrom of the trash tend to upset the streamline character of the flow. It is therefore necessary to limit the curvature of the path of the airstream so that conditions are stable and the streamline character of the flow is maintained under all working conditions.

The velocity of the air stream is so regulated that the wanted material, i. e. the lint, is carried through the opening $e$ without loss, but particles of less buoyancy than the lint fall or are flung out from the air stream and fall into the receptacle $i$ at the base of the settling chamber. The stability of the streamline flow also depends to some extent on the velocity, which must therefore in practice be maintained above the minimum theoretically necessary just to carry the wanted material through the opening $e$.

In practice the heaviest particles tend to fall out at once and particles of greater buoyancy are carried further towards the back of the settling chamber as shown by chain lines in Fig. 1. Particles of a buoyancy only slightly less than that of the wanted material are thrown out just before the air stream reaches the narrowing passage leading to the opening $e$. The machine therefore tends to sort the rejected material and the collection of different grades may be facilitated by the provision of partitions in the collecting receptacle $i$. In the region where the air stream begins to move upwards there is an increased tendency for the streamline flow to be disturbed. In order to increase the stability of the flow the path is constricted so as to increase the air velocity and an additional controlled air current may be introduced through the aperture $2$. This is guided by shaping the preliminary channel as shown so as to join the main stream in a smooth manner and its action is such as to prevent the stream breaking up into eddies in the neighbourhood of the bounding wall.

It may sometimes be the case that in order to maintain the stability of the streamline flow the velocity of the flow and the curvature of its course must be such that a certain amount of unwanted material is carried through and not deposited in the settling chamber, because its buoyancy too closely approximates to that of the wanted material. In such a case this unwanted material or a large proportion of it may be separated by a subsequent operation either through the same or another machine in which the velocity and curvature are adjusted to a more critical condition. This is rendered possible by the fact that the particles of less buoyancy have already been removed and since these constitute the greater part of the unwanted material, in the second operation there is comparatively little unwanted material to fall or be thrown out from the air stream and therefore there is less tendency for the streamline character of the flow to be disturbed.

Certain eddies will be produced in the settling chamber, e. g. at $d^x$ but so long as these are not in the main course of the flow they are unobjectionable and may even be beneficial, for experience has proved that they tend to maintain the stability of the streamline character of the main flow.

After separation has been achieved in the settling chamber the air stream carrying the lint leaves the settling chamber at $e$ and thereafter it may be acted on by an air stream $3$ entering from the space $j$. This results in eddying which assists to clear the teeth of the opening roller $c$ of any particles which may be adhering thereto, and thereby to prevent the opening roller from becoming clogged.

There may be provided a dust cage $m$ mounted on the shaft $m^3$, which may be of ordinary type but running at a higher speed than is usual. Preferably we use a high speed type of cage, running, for example, at 80 revolutions per minute, such as the well-known "Shirley" cage described in the specification of United States Letters Patent No. 1,810,675. The interior of the dust cage is exhausted by suitable fans or propellers such as $n$ through side ducts $n^1$, or otherwise in known manner. These fans or propellers serve to provide the main air stream through the settling chamber which subsequently passes through the holes in the periphery of the dust cage, if the latter is provided, taking with it the greater part of any remaining dust or dirt. An adjustable damper $m^1$ limits the suction area of the cage $m$ to a portion of the periphery extending from near the point of emergence of the air stream from the settling chamber to within a short distance of the delivery arrangements.

A stripping device $o$ with a stripping edge $o^1$ is placed near the said point of emergence and close to the opening roller $c$ so as to direct the material on to the dust cage. A cover $m^2$ is provided over the dust cage.

The delivery arrangements consist of a polished delivery plate $r$ fixed close to and at a small angle with the periphery of the cage $m$ at a dampered point thereof. A revolving clearer $t$ may be added to assist delivery to the collecting box $s$. This collecting box $s$ is shown closed at the bottom and with a hinged door $s^2$. Some air is drawn along the channel 4 between the wall $s^1$ of the collecting box and the dust cage $m$ and thence from the underside to the outer side of the periphery of the cage over the dampered portion preceding the plate $r$. This air serves to lift the material on to the delivery plate along which it is pushed by succeeding deliveries until it comes under the action of the clearer $t$.

The exhaust duct $p$ from the air propellers or fans may be fitted with an adjustable valve $q$ to regulate the flow.

It will be understood that after the air stream has emerged from the settling chamber it need no longer be and in general will not be of streamline character.

The driving arrangements for the apparatus illustrated will now be described.

A motor A provides the power, and by duplex belts $A^1$, drives the shaft $c^2$ of the opening roller $c$ supported in bearings $c^3$. A belt $A^2$ drives the shaft $n^2$ upon which the propellers $n$ are mounted. The shaft $c^2$ by a belt B drives a shaft $B^1$ supported in bearings and this shaft $B^1$, through gear wheels $B^2$, $B^3$, drives the shaft $m^3$ of the cage $m$. The gear wheel $B^3$ has a grooved boss $B^4$ which, by a crossed strap $B^5$, drives the pulley $t^1$ mounted on the shaft of the clearer $t$. On the shaft $B^1$ is a worm C which drives a worm wheel $C^1$ on the side shaft $C^2$. This side shaft $C^2$ has connected thereto and slidably mounted thereon, a movable dog-clutch half $C^3$ capable of engaging a loosely mounted dog-clutch half $C^4$ the latter being compounded with a worm $C^5$ which gears with a worm wheel $C^6$ mounted on the shaft $b^4$ of the feed roller $b$. A spring $C^7$ acting against a pinned-on collar $C^8$ tends to force the driven dog-clutch half $C^3$ into engagement with the dog-clutch half $C^4$, which occurring, the shaft of the feed roller $b$ is driven. In order to disengage the clutch halves $C^3$, $C^4$, a lever $C^9$ pivoted at $C^{10}$ is provided. When this is turned into a horizontal position, as shown in full lines at Fig. 5, the spring $C^7$ is compressed and the dog-clutch half $C^3$ is disengaged and the clutch half $C^4$ ceases to drive the worm $C^5$. If the lever $C^9$ be turned down (as in dotted lines in Fig. 5) the dog-clutch halves $C^3$, $C^4$ are engaged and the feed roller shaft $b^4$ is driven from the shaft $C^2$. This allows of the feed roller $b$ being instantly stopped or started.

Cotton after one passage through the above described apparatus is cleaner than if it had gone through the full sequence of the opening and cleaning machines of a normal blowing-room. After two passages, even through the same machine with its working conditions unaltered, the quantity of trash remaining is negligible for nearly all purposes. By suitable adjustments of the velocity and of the curvature of the course of the stream-line flow in successive operations, practically any desired degree of cleanliness can be attained.

We declare that what we claim is:—

1. The method of separating component materials in a mixture, which consists in directing a fluid stream containing comminuted material in a lateral direction against a rotating surface over a body of substantially quiescent air, deflecting said stream downwardly after impingement on said rotating surface, causing said stream to be deflected downwardly away from said rotating surface, then deflecting said stream upwardly while passing beneath said rotating surface, whereby the fluid stream in passing over said quiescent air body carries the lighter particles in suspension, and the heavier particles are discharged into said quiescent air body.

2. The method of separating component materials from a mixture, which consists in delivering the mixture into a fluid flow, and causing said flow with the contained mixture to impinge upon a rotating downwardly curved surface and pass above a quiescent body of fluid of substantially greater depth than that of the flowing fluid, the path of flow of said fluid being so directed that components of the mixture having least buoyancy will fall by gravity those having greatest buoyancy will remain in the flow while those having intermediate buoyancy will be removed from the flow by centrifugal action.

3. The method of separating component materials from a mixture, which consists in delivering the mixture into a fluid flow, and causing said flow with the contained mixture to impinge upon a rotating downwardly curved surface and pass above a quiescent body of fluid of substantially greater depth than that of the flowing fluid, the path of flow of said fluid being so directed that components of the mixture having least buoyancy will fall by gravity those having greatest buoyancy will remain in the flow while those having intermediate buoyancy will be removed from the flow by centrifugal action, and directing a second flow of fluid into said flow after separation of the components of the mixture.

4. Apparatus of the class described including a sorting chamber having oppositely disposed inlet and outlet openings at its upper end, means to project a fluid stream between said openings, said chamber extending below the location of said fluid stream and in whose lower part the particles which fall out of the stream are collected, and guide means in said chamber between said inlet and outlet, and curved so as to direct the fluid stream to flow in a curvilineal path, said guide means including a rotating cylindrical member against the lower part of which the fluid stream impinges and a guide member in close proximity to said cylindrical member to deflect the stream.

5. Apparatus of the class described including a sorting chamber having oppositely disposed inlet and outlet openings at its upper end, means to project a fluid stream between said openings, said chamber extending below the location of said fluid stream and in whose lower part the particles which fall out of the stream are collected, and guide means in said chamber between said inlet and outlet and downwardly curved to deflect the fluid stream downwardly between the inlet and outlet, said guide means including a rotating element in the path of said stream, the part of the chamber lying between the vertical line through the axis of the rotating element and the wall adjacent the outlet being entirely unobstructed.

6. Apparatus of the class described including a sorting chamber having oppositely disposed inlet and outlet openings at its upper end, means to project a fluid stream between said openings, said chamber extending below the location of said fluid stream and in whose lower part the particles which fall out of the stream are collected, and guide means in said chamber between said inlet and outlet and downwardly curved to deflect the fluid stream downwardly between the inlet and outlet, said guide means including a rotating element in the path of said stream, and further including a deflecting plate fairing into the rotating means and toward the outlet to produce smooth transition of the stream from the rotating means, the part of the chamber lying between the vertical line through the axis of the rotating element and the wall adjacent the outlet being entirely unobstructed.

7. Apparatus of the class described including a sorting chamber having oppositely disposed inlet and outlet openings at its upper end, means to project a fluid stream between said openings, said chamber extending below the location of said fluid stream and in whose lower part the particles which fall out of the stream are collected, and guide means in said chamber between said inlet and outlet and downwardly curved to deflect the fluid stream downwardly between the inlet and outlet, said guide means including a rotating element in the path of said stream, and further including a deflecting plate fairing into the rotating means and toward the outlet to produce smooth transition of the stream from the rotating means, the part of the chamber lying between the vertical line through the axis of the rotating element and the wall adjacent the outlet being entirely unobstructed, said chamber having an opening therein adjacent the outlet to provide an auxiliary stream entering the main stream in the direction of motion thereof.

8. Apparatus of the class described including a sorting chamber having oppositely disposed inlet and outlet openings at its upper end, means to project a fluid stream between said openings, said chamber extending below the location of said fluid stream and in whose lower part the particles which fall out of the stream are collected, guide means in said chamber between said inlet and outlet and downwardly curved to deflect the fluid stream downwardly between the inlet and outlet, said guide means including a rotating element in the path of said stream and further including a deflecting plate fairing into the rotating means and toward the outlet to produce smooth transition of the stream from the rotating means, the part of the chamber lying between the vertical line through the axis of the rotating element and the wall adjacent the outlet being entirely unobstructed, said chamber having an opening therein adjacent the outlet to provide an auxiliary stream entering the main stream in the direction of motion thereof, and means for constricting passage of the said stream to the outlet.

9. Apparatus of the class described including a sorting chamber having oppositely disposed inlet and outlet openings at its upper end, means to project a fluid stream between said openings, said chamber extending below the location of said fluid stream and in whose lower part the particles which fall out of the stream are collected, guide means in said chamber between said inlet and outlet and downwardly curved to deflect the fluid stream downwardly between the inlet and outlet, said guide means including a rotating element in the path of said stream and further including a deflecting plate fairing into the rotating means and toward the outlet to produce smooth transition of the stream from the rotating means, the part of the chamber lying between the vertical line through the axis of the rotating element and the wall adjacent the outlet being entirely unobstructed, said chamber having an opening therein adjacent the outlet to provide an auxiliary stream entering the main stream in the direction of motion thereof, and means to introduce material to be sorted prior to the contact of the stream with the rotating element.

10. Apparatus of the class described including a sorting chamber having oppositely disposed inlet and outlet openings at its upper end, means to project a fluid stream between said openings, said chamber extending below the location of said fluid stream and in whose lower part the particles which fall out of the stream are collected, guide means in said chamber between said inlet and outlet and downwardly curved to deflect the fluid stream downwardly between the inlet and outlet, said guide means including a rotating element in the path of said stream and further including a deflecting plate fairing into the rotating means and toward the outlet to produce smooth transition of the stream from the rotating means, the part of the chamber lying between the vertical line through the axis of the rotating element and the wall adjacent the outlet being entirely unobstructed, said chamber having an opening therein adjacent the outlet to provide an auxiliary stream entering the main stream in the direction of motion thereof, and brush like projections on said rotating element.

11. Apparatus of the class described including a sorting chamber having oppositely disposed inlet and outlet openings at its upper end, means to project a fluid stream between said openings, said chamber extending below the location of said fluid stream and in whose lower part the particles which fall out of the stream are collected, guide means in said chamber between said inlet and outlet and downwardly curved to deflect the fluid stream downwardly between the inlet and outlet, said guide means including a rotating element in the path of said stream and further including a deflecting plate fairing into the rotating means and toward the outlet to produce smooth transition of the stream from the rotating means, the part of the chamber lying between the vertical line through the axis of the rotating element and the wall adjacent the outlet being entirely unobstructed, said chamber having an opening therein adjacent the outlet to provide an auxiliary stream entering the main stream in the direction of motion thereof, brush like projections on said rotating element, and other means to introduce fluid streams into the first mentioned stream at such angles as to produce eddying.

THOMAS CLIFFORD WILLIAMS.
SYDNEY ALFRED SHORTER.